(12) United States Patent
Tecu

(10) Patent No.: US 11,481,507 B2
(45) Date of Patent: Oct. 25, 2022

(54) AUGMENTED REALITY DOCUMENT REDACTION

(71) Applicant: Konica Minolta Business Solutions U.S.A., Inc., San Mateo, CA (US)

(72) Inventor: Kirk Steven Tecu, Longmont, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 941 days.

(21) Appl. No.: 16/234,071

(22) Filed: Dec. 27, 2018

(65) Prior Publication Data

US 2020/0210601 A1 Jul. 2, 2020

(51) Int. Cl.
| | |
|---|---|
| *G06F 21/62* | (2013.01) |
| *H04N 1/44* | (2006.01) |
| *G06V 20/20* | (2022.01) |
| *G06V 30/416* | (2022.01) |
| *G06V 30/10* | (2022.01) |
| *G06F 21/84* | (2013.01) |
| *G06V 30/14* | (2022.01) |
| *G06F 17/00* | (2019.01) |

(52) U.S. Cl.
CPC .......... *G06F 21/6209* (2013.01); *G06V 20/20* (2022.01); *G06V 30/416* (2022.01); *H04N 1/444* (2013.01); *G06F 21/6245* (2013.01); *G06F 21/84* (2013.01); *G06V 30/10* (2022.01); *G06V 30/1444* (2022.01)

(58) Field of Classification Search
CPC .... G06F 21/6245; G06F 16/93; G06F 40/166; G06F 2221/2141; G06F 21/60; G06F 40/103; G06F 2221/2113; G06F 16/2365; G06F 40/117; G06F 2221/2149; G06F 21/6209; G06F 21/84; G06V 20/20; G06V 30/416; G06V 30/10; G06V 30/1444; H04N 1/444
See application file for complete search history.

(56) References Cited

U.S. PATENT DOCUMENTS

| | | | |
|---|---|---|---|
| 7,913,167 B2 * | 3/2011 | Cottrille | G06F 21/6245 |
| | | | 715/271 |
| 9,712,693 B2 | 7/2017 | Sato | |
| 10,528,838 B1 * | 1/2020 | Carter, Jr. | G06Q 20/383 |
| 2006/0259983 A1 * | 11/2006 | Sperry | H04L 9/3234 |
| | | | 726/28 |

(Continued)

*Primary Examiner* — Quoc A Tran
(74) *Attorney, Agent, or Firm* — Osha Bergman Watanabe & Burton LLP

(57) ABSTRACT

A method for processing an image of a physical document to show a redacted portion including: identifying a tag associated with the redacted portion and including first user rights; obtaining, using the identified tag, a digital copy of the physical document including a non-redacted form of the redacted portion; receiving, from an external device, second user rights; determining that the second user rights match the first user rights; outputting, based on the determination, information indicating that the non-redacted form of the redacted portion is able to be shown; receiving, in response to the non-redacted form being able to be shown, an instruction to display the non-redacted form; and displaying, based on the instruction and using a projector onto a surface a predetermined distance from the physical document, the non-redacted form of the redacted portion.

19 Claims, 6 Drawing Sheets

(56) References Cited

U.S. PATENT DOCUMENTS

| | | | | |
|---|---|---|---|---|
| 2008/0002911 A1* | 1/2008 | Eisen | ................... | H04N 1/4486 |
| | | | | 382/283 |
| 2015/0200922 A1* | 7/2015 | Eschbach | ................ | H04L 63/08 |
| | | | | 358/1.14 |
| 2020/0134240 A1* | 4/2020 | Balakrishna | ............ | G06F 3/147 |

* cited by examiner

AUGMENTED REALITY DOCUMENT REDACTION

BACKGROUND

Augmented Reality (AR) enables users to generate an interactive experience of a real world environment by superimposing a computer-generated image over physical objects within the users' views. However, the use of AR glasses may cause discomfort for certain users.

Redaction of information in electronic (i.e., digital copies of) documents allows users to easily control access to sensitive and confidential information. Access to any redacted information (i.e., redacted portions) on physical documents can be easily obtained as long as the user has access to the original electronic document and rights (i.e., authority) to the view the redacted information. Regardless, users with the rights to view redacted information on a physical document still wish to have access to the redacted information even without access to the original electronic document.

SUMMARY

In general, in one aspect, the invention relates to a method for processing an image of a physical document to show or display a redacted portion of the physical document. The process comprising: identifying, on the physical document, a tag associated with the redacted portion and comprising first user rights; obtaining, based on the identified tag, a digital copy of the physical document comprising a non-redacted form of the redacted portion; receiving, from a device within a predetermined distance from the physical document, second user rights; comparing the second user rights to the first user rights and determining that the second user rights match the first user rights; outputting, based on the determination, information indicating that the non-redacted form of the redacted portion is able to be shown or displayed; receiving, in response to the non-redacted form being able to be shown or displayed, an instruction to display the non-redacted form of the redacted portion; and displaying, based on the instruction and using a projector onto a surface a predetermined distance from the physical document, the non-redacted form of the redacted portion.

In general, in one aspect, the invention relates to a non-transitory computer readable medium (CRM) storing computer readable program code for processing an image of a physical document to show or display a redacted portion of the physical document embodied therein. The computer readable program code causes a computer to: identify, on the physical document, a tag associated with the redacted portion and comprising first user rights; obtain, based on the identified tag, a digital copy of the physical document comprising a non-redacted form of the redacted portion; receive, from a device within a predetermined distance from the physical document, second user rights; compare the second user rights to the first user rights and determine that the second user rights match the first user rights; output, based on the determination, information indicating that the non-redacted form of the redacted portion is able to be shown or displayed; receive, in response to the non-redacted form being able to be shown or displayed, an instruction to display the non-redacted form of the redacted portion; and display, based on the instruction and using a projector onto a surface a predetermined distance from the physical document, the non-redacted form of the redacted portion.

In general, in one aspect, the invention relates to a system for processing an image of a physical document to show or display a redacted portion of the physical document. The system comprising: a memory; and a computer processor connected to the memory. The computer processor: identifies, on the physical document, a tag associated with the redacted portion and comprising first user rights; obtains, based on the identified tag, a digital copy of the physical document comprising a non-redacted form of the redacted portion; receives, from a device within a predetermined distance from the physical document, second user rights; compares the second user rights to the first user rights and determines that the second user rights match the first user rights; outputs, based on the determination, information indicating that the non-redacted form of the redacted portion is able to be shown or displayed; receives, in response to the non-redacted form being able to be shown or displayed, an instruction to display the non-redacted form of the redacted portion; and displays, based on the instruction and using a projector onto a surface a predetermined distance from the physical document, the non-redacted form of the redacted portion.

Other aspects of the invention will be apparent from the following description and the appended claims.

DETAILED DESCRIPTION

Figure 1:
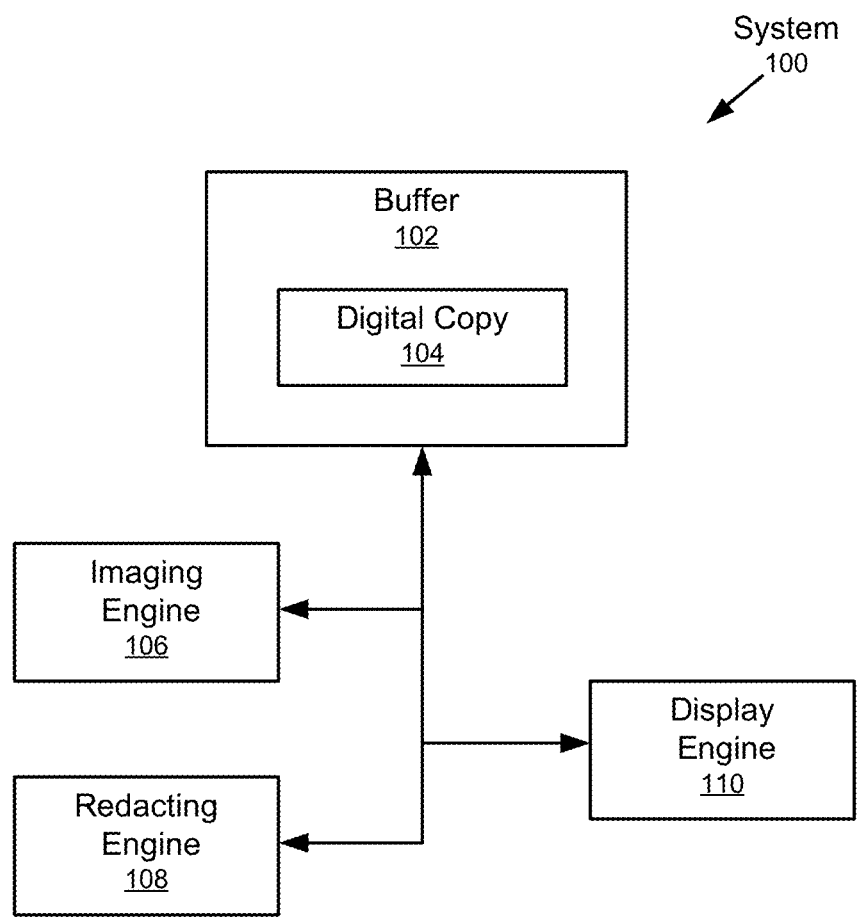
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for processing an image of a physical document to show or display a redacted portion of the physical document. Specifically, a physical document with a redacted portion is imaged using a Projection with Interactive Capture (PIC) device. The PIC device, described in more detail below in FIG. 3, includes an imaging component (e.g., a 2-dimensional and/or 3-dimensional imager) and a projection component (e.g., a projector) that work in tandem to create an AR environment without the need for AR glasses. The PIC device identifies a tag associated with the redacted information on the physical document and retrieves an electronic version (i.e., a digital copy) of the physical document that includes the non-redacted form of the redacted information based on the identified tag. The PIC device then authenticates the user to determine whether the user has rights (i.e., authority) to show or display (i.e., to view) the non-redacted format of the redacted information. Once the user's rights have been confirmed, the PIC device may display the non-redacted format of the redacted information to the user.

FIG. 1 shows a system (100) in accordance with one or more embodiments of the invention. As shown in FIG. 1, the system (100) has multiple components, including, for example, a buffer (102), an imaging engine (106), a redacting engine (108), and a display engine (110). Each of these components (102, 106, 108, and 110) may be located on the same computing device (e.g., personal computer (PC), laptop, tablet PC, smart phone, multifunction printer, kiosk, server, PIC device, etc.) or on different computing devices connected by a network of any size having wired and/or wireless segments. Each of these components is discussed below.

The buffer (102) may be implemented in hardware (i.e., circuitry), software, or any combination thereof. The buffer (102) is configured to store a digital copy (104) of a physical document containing redacted information. Multiple digital copies (104) of different physical documents may be stored in the buffer (102). The buffer (104) may be disposed in a local computer being used by the user or in a remote server accessible by the local computer.

The digital copy (104) may be an electronic version of a physical document including a portion of information that has been redacted (i.e., one or more redacted portions). The digital copy (104) may include the non-redacted form (i.e., the redacted content) of the redacted portion on the physical document. The digital copy (104) may be saved in the buffer (102) in any format (e.g., an OOXML document, a PDF document, etc.). The physical document may also include multiple redacted portions.

The redacted portion of the physical document may include a visible tag (e.g., a barcode, a Quick Response (QR) code, etc.) including document information used for locating the digital copy (104) of the physical document in order to access the redacted content. The visible tag may further include user rights information (i.e., user authority information) indicating a level of user rights (i.e., an amount of user authority) required to show or display the redacted content.

If the physical document includes multiple reacted portions, each redacted portion may have the same visible tag including the same document and user rights information. Alternatively, each redacted portion may have a unique one of the visible tag that includes different user rights information indicating different levels of user rights (i.e., different levels of user authority). For example, assume that the redacted document has two redacted portions, one of the two redacted portions may require a higher level of user rights to be shown or displayed than the other. Therefore, the user rights information of the two redacted portions will be different.

The system (100) further includes the imaging engine (106). The imaging engine (106) may be implemented in hardware (i.e., circuitry), software, or any combination thereof. The imaging engine (106) images the physical document to retrieve the digital copy (104).

The imaging engine (106) may include a 2-dimensional and/or 3-dimensional imager (e.g., a camera, a combination of cameras, etc.) that captures a digital image of the physical document. In imaging engine (106) performs an optical character recognition and non-text content analysis on the digital image of the physical document to identify the visual tag.

The system (100) further includes the redacting engine (108). The redacting engine (108) may be implemented in hardware (i.e., circuitry), software, or any combination thereof. The redacting engine (108) controls the user's access to the redacted content.

The redacting engine (108) analyzes the identified visual tag and retrieves the digital copy (104) of the physical document from the buffer (104) based on the document information stored in the visual tag.

The redacting engine (108) receives user rights information (i.e., user authentication information) from a user that includes the user's user rights. The user authentication information may be transmitted by the user to the redacting engine (108) in any form (e.g., direct input by the user, transmission through radio-frequency identification (RFID), near-field communication, etc.) using any device (e.g., a keyboard, a mouse, a microphone, a RFID tag, a RFID and/or near-field communication enabled wristband, etc.).

Different users' user authentication information may include different levels of user rights. For example, assume that a first user is a manager and a second user is an employee working under the first user. The user authentication information of the first user will indicate a higher level of user rights than the user authentication information of the second user. The levels of user rights may be set up in any way that indicates a clear hierarchical system among the individuals within an establishment (e.g., a company, a corporation, a university, a hospital, etc.).

The redacting engine (108) further compares the user rights information stored in the identified visual tag to the user authentication information to determine whether the user is able to (i.e., has the authority) to show or display the redacted content. The user is able to show or display the redacted content if the user authentication information matches or is higher than the user rights information stored in the visual tag. Alternatively, the user is unable to show or display the redacted content if the user authentication information is lower than the user rights information stored in the visual tag.

The redacting engine (108) may require the user to continuously provide the user authentication information (e.g., through continuous detection by RFID or near-field communication). Once the redacting engine (108) stops receiving user authentication information, the redacted content will no longer be available. Alternatively, once the user authentication information has been received and authenticated, the user gains access to the redacted content for a predetermined amount of time before the redacting engine (108) requests the user to retransmit the user authentication information to maintain access to the reacted content.

The system (100) further includes the display engine (110). The display engine (110) may be implemented in hardware (i.e., circuitry), software, or any combination thereof. The display engine (110) generates, using one or more lights, effects, and/or images, an AR environment around the physical document for the user to interact with the physical document.

The AR environment may be generated within a predetermined area surrounding the physical document. The size of the predetermined area may be determined based on the capabilities of a projection unit within or connected to the system (100). This is exemplified in more detail below in reference to FIG. 4B.

In response to the redacting engine (108) determining that the user is able to (i.e., has the authority to) show or display the redacted content, the display engine (110) displays (i.e., projects) within the AR environment information indicating that the redacted information is able to be shown or displayed (i.e., is viewable). The information may be in a form of a virtual button with which the user can interact to display the redacted content. The information may also be a line of text, displayed within the AR environment, indicating that the redacted information is able to be shown or displayed (i.e., is viewable). The information may also be communicated to the user in audio form. Any combination of the above forms of informing the user may be possible. This is exemplified in more detail below in reference to FIG. 4B.

The display engine (110) further works in tandem with the imaging engine (106) to detect the user's interaction with the AR environment. The imaging engine (106) continuously images the AR environment to determine the user's gestures (i.e., interactions with any physical and/or virtual object) within the AR environment. The imaging engine (110) translates the user's gestures into pre-configured actions. Alternatively, the imaging engine (106) may capture an image of the AR environment at predetermined intervals and analyze the captured image for changes within the AR environment to determine the user's gestures. For example, assume that the user's finger is on a virtual button generated by the display engine (110), the imaging engine (106) detects the user's finger on the virtual button and translates the user's gesture as an action of pressing the virtual button.

In response to receiving a gesture from the user (i.e., an instruction from the user) to display the redacted content, the display engine (110) generates the redacted content within the AR environment for showing or displaying to the user. The gesture from the user must be continuous for the display engine (110) to continuously display the redacted content. Once the user's gesture cannot be detected, the display engine (110) stops displaying the redacted content. Alternatively, the display engine (110) displays the redacted content for a predetermined time after the user's gesture has been detected until requiring the user's gesture to be detected again.

The display engine (110) may further generate virtual versions of physical components normally appearing in and/or on computing systems for the user to interact with within the AR environment in order to input a command. Such components may be, and are not limited to, a scroll bar, a print button, an email button, a zoom button, an enlarge button, etc.

Figure 2:
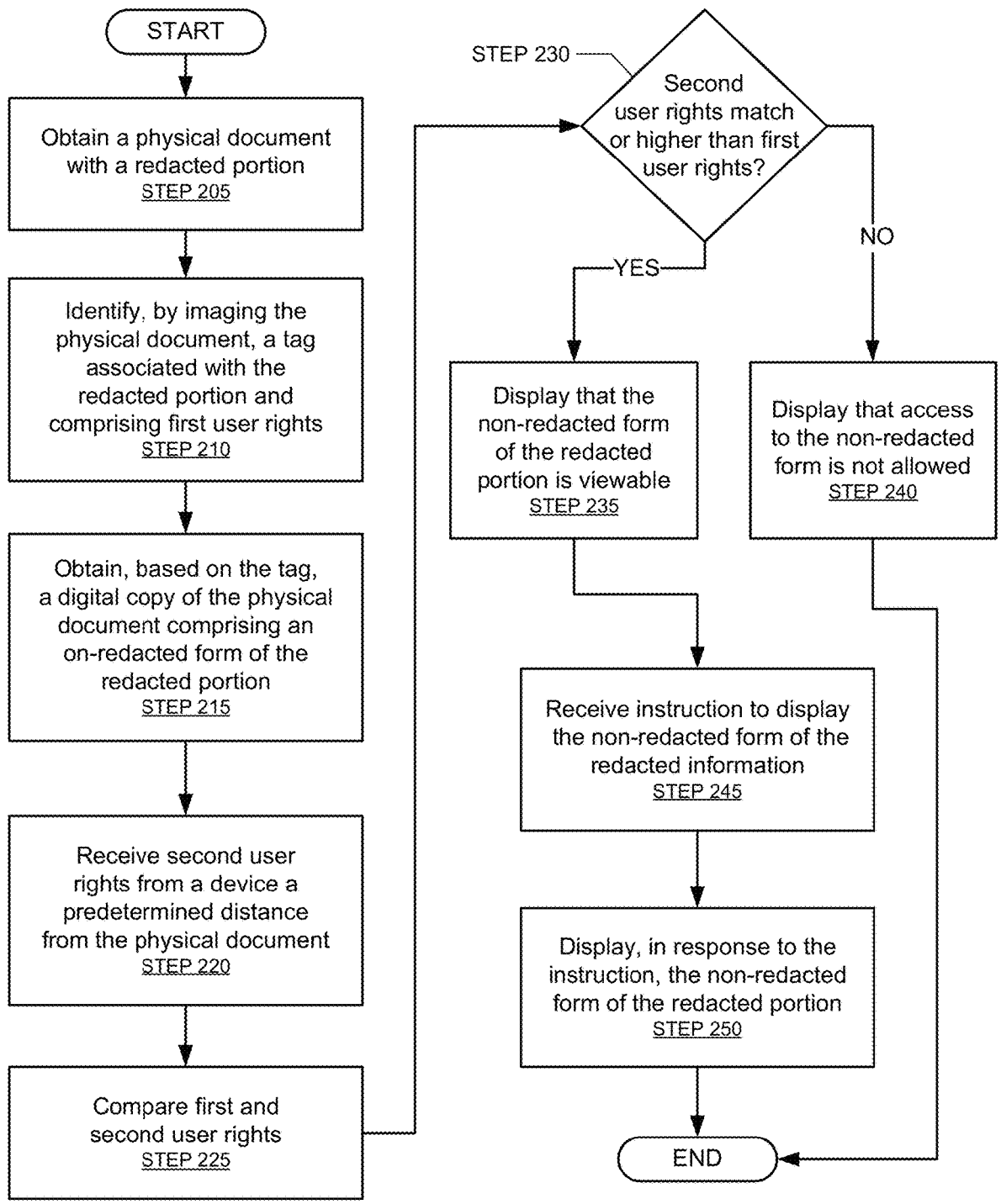
FIG. 2 shows a flowchart in accordance with one or more embodiments of the invention.

FIG. 2 shows a flowchart in accordance with one or more embodiments of the invention. Specifically, the flowchart depicts a process for processing an image of a physical document to show or display a redacted portion of the physical document. One or more of the steps in FIG. 2 may be performed by the components of the system (100), discussed above in reference to FIG. 1. One or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a physical document is obtained (STEP 205). The physical copy may be obtained by printing an electronic version (i.e., a digital copy), which may be obtained (e.g., downloaded, scanned, etc.) from any source and may be of any size or format. Alternatively, the physical document may be obtained by direct physical transfer from one user to another. In this case, the user receiving the physical document does not have access to the digital copy. The physical document includes a portion of information that has been redacted (i.e., one or more redacted portions).

In STEP 210, as discussed above in reference to FIG. 1, the physical document is imaged and a visual tag associated with a redacted portion on the physical document is identified. The visual tag may include document information used for locating the digital copy and user rights information (i.e., user authority information) indicating a level of user rights (i.e., an amount of user authority) required to show or display the non-redacted form (i.e., the redacted content) of the redacted portion.

In STEP 215, as discussed above in reference to FIG. 1, the digital copy of the physical document is obtained based on the document information. The digital copy may be obtained from a buffer of a local computing system. Alternatively, the digital copy may be obtained from a buffer of a remote server accessible by the local computing system.

In STEP 220, as discussed above in reference to FIG. 1, a user authentication information including user rights of a user handling the physical document is received from a device a predetermined distance from the physical document. The user authentication information may be transmitted in any form (e.g., direct input by the user, transmission through radio-frequency identification (RFID), near-field communication, etc.) using any device (e.g., a keyboard, a mouse, a microphone, an RFID tag, an RFID and/or near-field communication enabled wristband, etc.).

As discussed above in reference to FIG. 1, the user rights information (i.e., a first user rights) is compared with the user authentication information (i.e., a second user rights) and a determination is made in STEP 230 to determine whether the second user rights match or is higher than the first user rights.

If the determination in STEP 230 is NO, an indication that the user is not allowed to show or display the redacted content is displayed in STEP 240 and the process ends.

If the determination in STEP 230 is YES, as discussed above in reference to FIG. 1, the process proceeds to STEP 235 where an indication that the redacted content is able to be shown or displayed (i.e., is viewable) is displayed within an AR environment surrounding the physical document.

In STEP 245, as discussed above in reference to FIG. 1, an instruction is received to display the redacted content and, in response to receiving the instruction, the redacted content is displayed in STEP 250.

If the physical document includes multiple redacted portions, the certain steps of FIG. 2 (e.g., STEPS 225 through 250) may be repeated for each of the redacted portions based on a selection by the user to show or display one of the multiple redacted portions. Based on the level of user rights stored in the user authority information, the user may not be able to show or display all of the redacted portions on the physical document. For example, assume that one of the redacted portions includes a level of user rights higher than that of the user's level of user rights. This redacted portion will not be able to be shown or displayed (i.e., will not be viewable) by the user.

Figure 3:
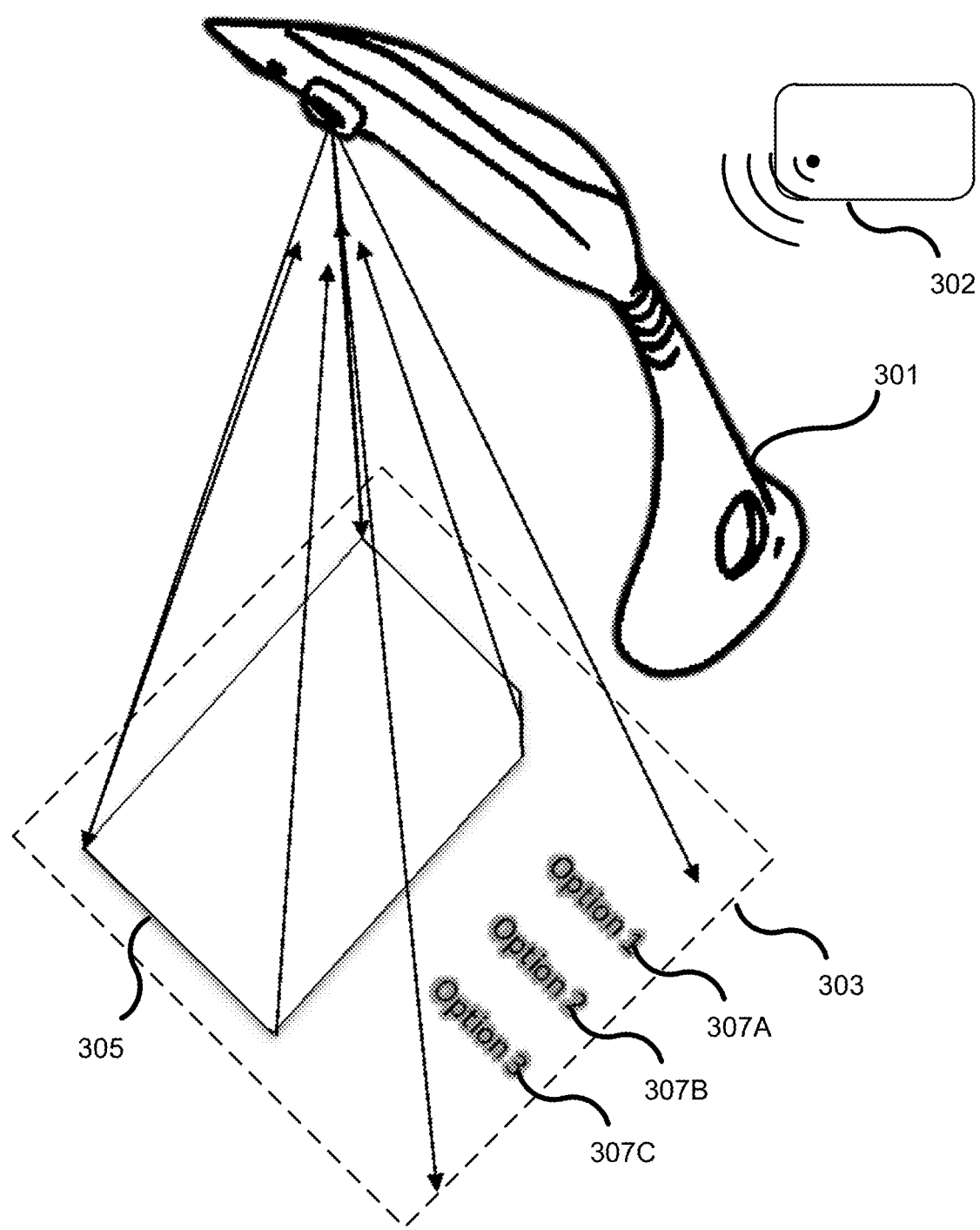
FIG. 3 shows an implementation example in accordance with one or more embodiments of the invention.

FIG. 3 shows an implementation example in accordance with one or more embodiments of the invention. As shown in FIG. 3, a Projection with Interactive Capture (PIC) device (301) includes an imaging component (e.g., a 2-dimensional and/or 3-dimensional imager) and a projection component (e.g., a projector) that work in tandem to create an AR environment (303) around a predetermined area surrounding a physical document (305). Digital content (307A-307C) is projected (i.e., displayed) to a user within the AR environment (303). The configuration shown in FIG. 3 enables the bridging of the physical to digital world using AR without the need to wear AR glasses. Further, the PIC device may be controlled using the system (100) as discussed above in reference to FIG. 1.

As shown in FIG. 3, a user device (302) within a predetermined distance from the physical document (305) transmits a user authentication information to the PIC device (301). The user authentication information may be transmitted in any form (e.g., direct input by the user, transmission through radio-frequency identification (RFID), near-field communication, etc.) using any device (e.g., a keyboard, a mouse, a microphone, an RFID tag, an RFID and/or near-field communication enabled wristband, etc.).

Figure 4A:
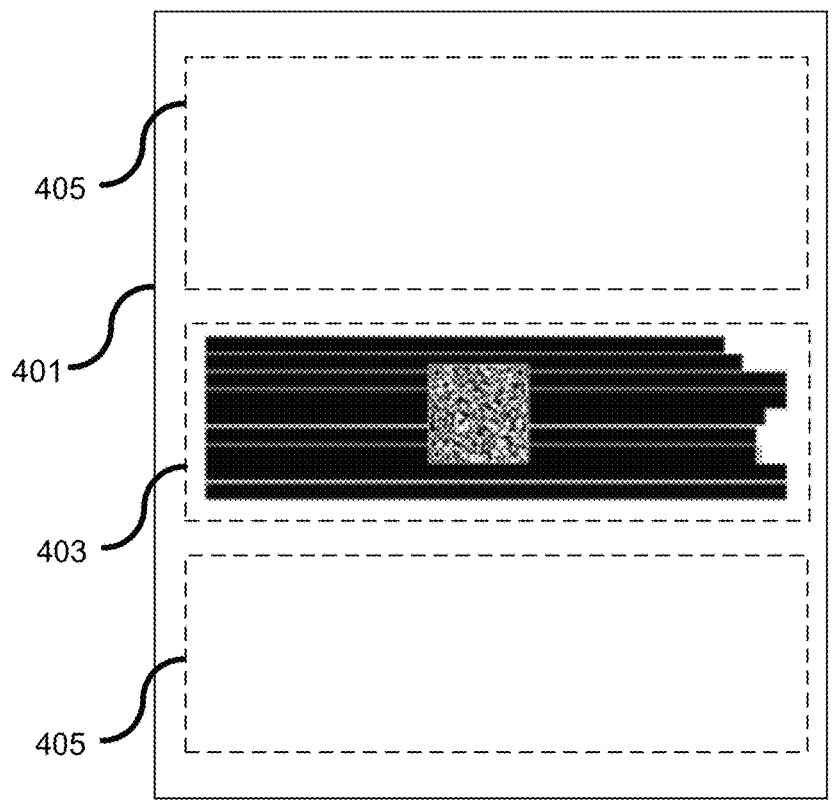
FIGS. 4A to 4D show additional implementation examples in accordance with one or more embodiments of the invention.
Figure 4B:
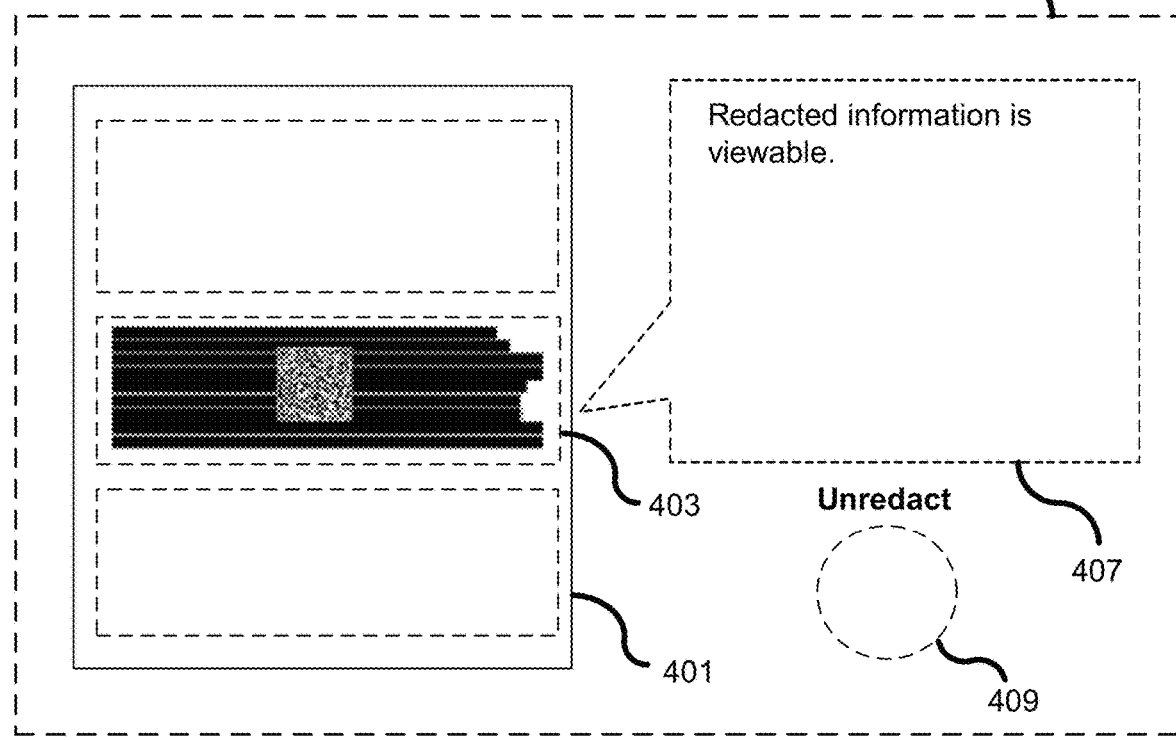
Figure 4C:
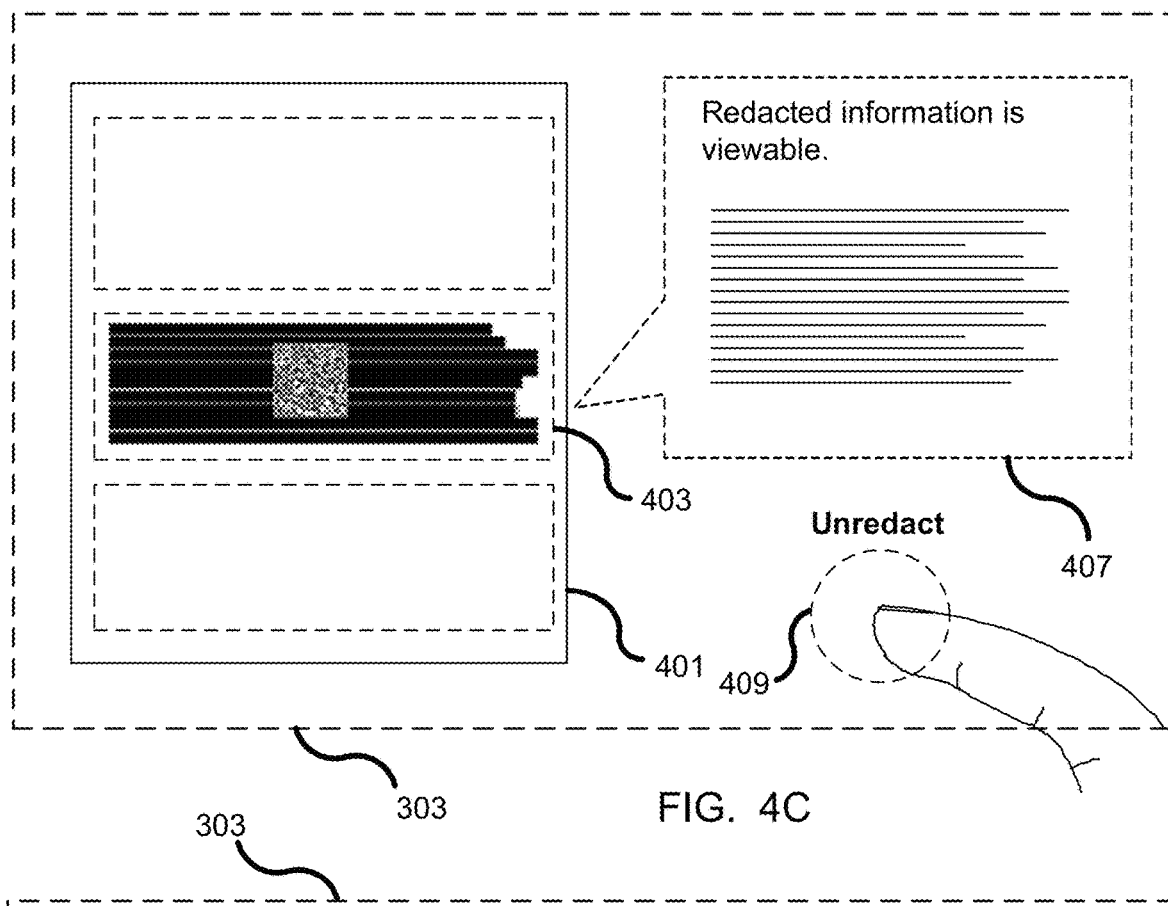

FIGS. 4A to 4C show additional implementation examples according to one or more embodiments. As shown in FIG. 4A, a physical document (401) includes a redacted portion (403) including a visual tag (e.g., a QR code) and non-redacted portions (405). The physical document (401) may include multiple redacted portions (403).

FIG. 4B shows the physical document (401) within the AR environment (303) shown in FIG. 3. As shown in FIG. 4B, the AR environment (303) surrounds the physical document (401) and includes a display window (407) and a virtual button (409). The display window (407) displays information being conveyed by the PIC device to the user (e.g., an indication that the non-redacted form (i.e., the redacted content) of the redacted portion (403), the redacted content, an instruction for the user, etc.). The virtual button (409) allows the user to show or display (i.e., unredact) the redacted portion (403) when interacted with (i.e., pressed) by the user.

FIG. 4C shows the displaying of the redacted content within the display window (407). As shown in FIG. 4C, the user's finger is detected on (i.e., pressing) the virtual button (409). The redacted content may only be displayed if the PIC device determines that the user has the authority to show or display the redacted content, which is discussed in more detail above in reference to FIG. 1.

Figure 4D:
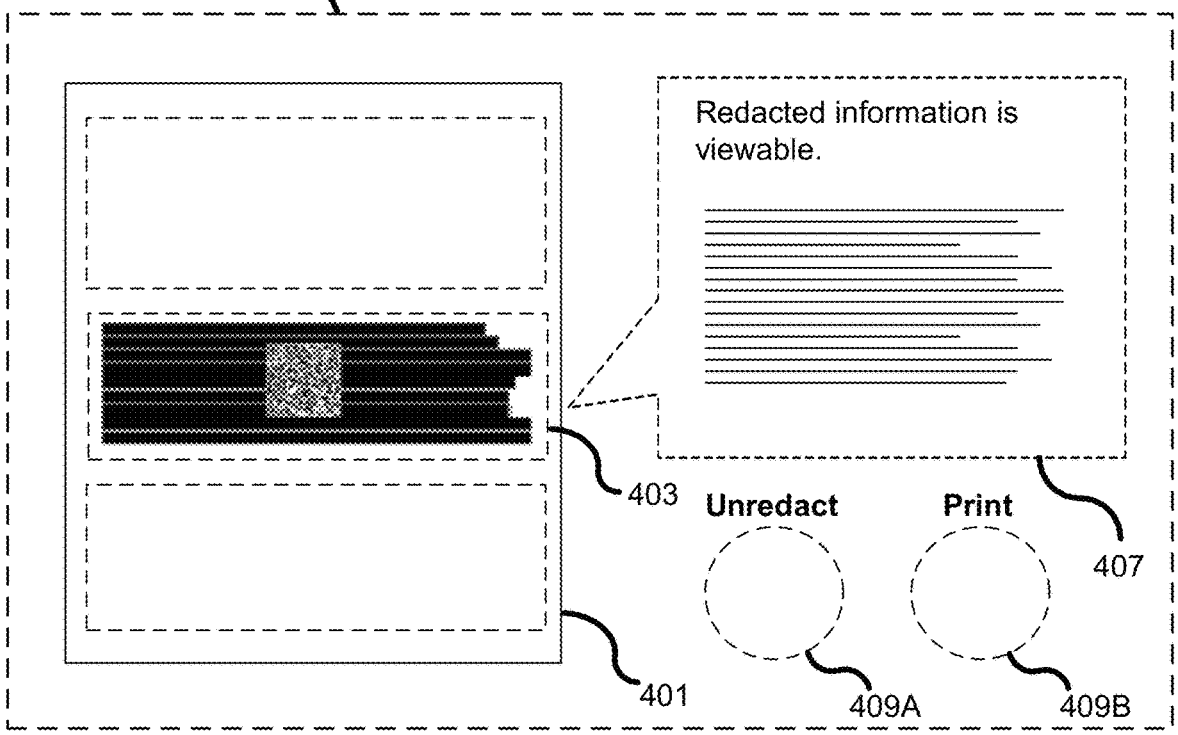

FIG. 4D shows the AR environment (403) includes multiple of the virtual buttons (409) as shown in FIGS. 4B and 4C. As shown in FIG. 4D, the AR environment includes a first virtual button (409A) for displaying the redacted content (i.e., the unredact button) and a second virtual button (409B) for printing the redacted content. The redacted content may only be printable if the PIC device determines that the user has the authority to show or display the redacted content, which is discussed in more detail above in reference to FIG. 1.

Figure 5:
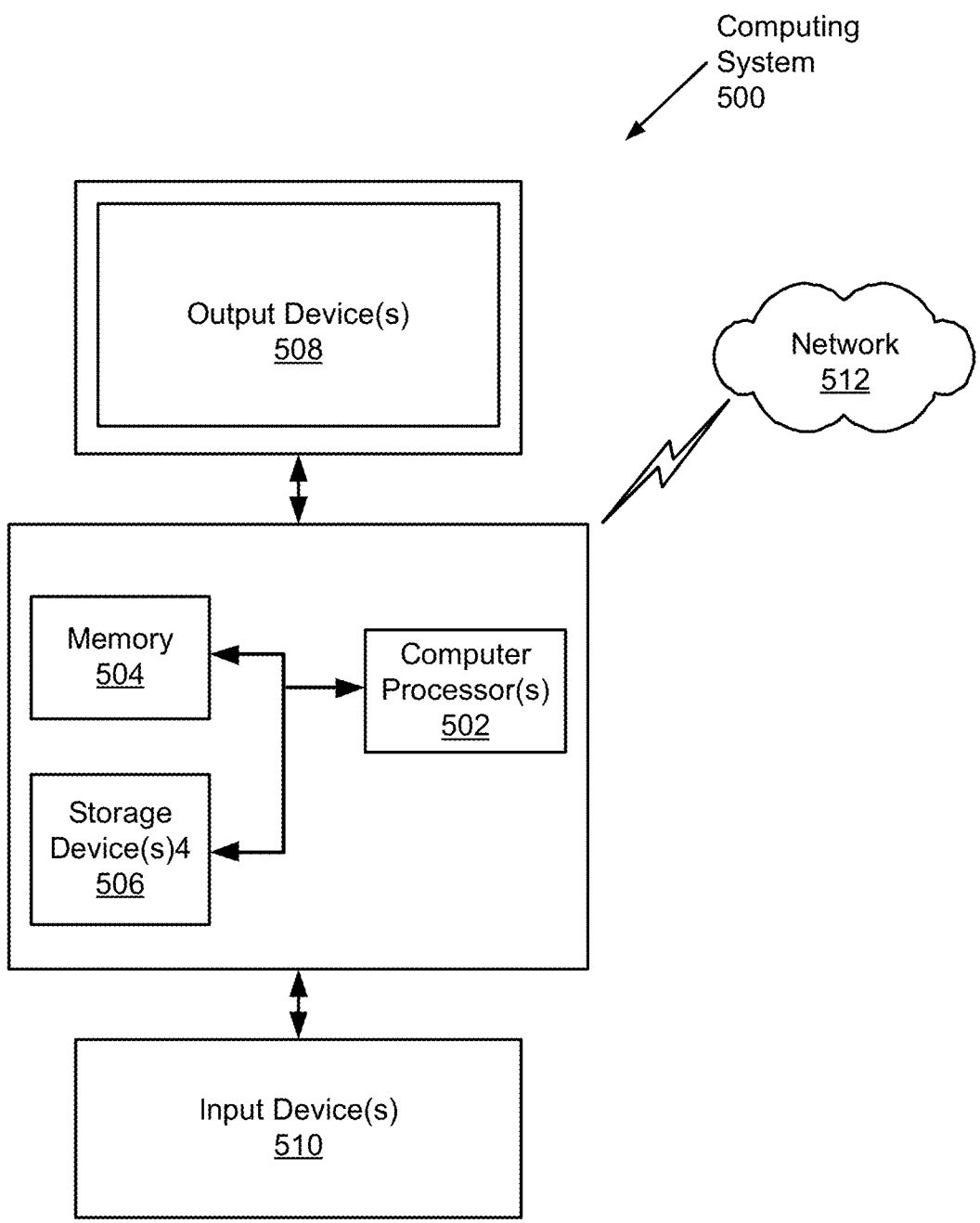
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the invention may have one or more of the following advantages: the ability to bridge the physical to the digital world when a user prefers to interact with physical copies of documents; the ability to allow a user to interact with an AR environment without wearing AR glasses; the ability to show or display redacted content on a physical document without direct access to the digital copy of the physical document (i.e., when only the physical copy of the document is available to a user or when the user does not know the location of the digital copy); the ability to control user access to certain redacted information on a physical document based on the user's rights (i.e., authority); etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an image of a physical document to show or display a redacted portion of the physical document, comprising:
   identifying, on the physical document, a tag associated with the redacted portion and comprising first user rights;
   obtaining, based on the identified tag, a digital copy of the physical document comprising a non-redacted form of the redacted portion;
   receiving, from a device within a predetermined distance from the physical document, second user rights;
   comparing the second user rights to the first user rights and determining that the second user rights match the first user rights;
   projecting onto a surface of an augmented reality (AR) environment surrounding the physical document, based on the determination, information indicating that the non-redacted form of the redacted portion is able to be shown or displayed;
   receiving, in response to the non-redacted form being able to be shown or displayed, an instruction to display the non-redacted form of the redacted portion; and
   projecting onto the surface at a predetermined distance from the physical document, based on the instruction, the non-redacted form of the redacted portion, wherein
   the information includes a virtual button projected onto the surface in the AR environment, and
   the instruction includes an interaction with the virtual button on the surface of the AR environment.

2. The method of claim 1, wherein identifying the tag further comprises:
   imaging the physical document to digitize a content of the physical document;
   analyzing the content using an optical character recognition and non-text content analysis; and
   identifying the tag within the analyzed content.

3. The method of claim 1, further comprising:
   continuously displaying the non-redacted form of the redacted portion on the surface while the second user rights are received from the device; and
   stopping the displaying of the non-redacted form of the redacted portion when a stop of receipt of the second user rights is detected.

4. The method of claim 1, wherein
   the displaying of the non-redacted form of the redacted portion on the surface continues as long as the interaction with the virtual button continues, and
   the method further comprises:
      stopping the displaying of the non-redacted form of the redacted portion when when the interaction with the virtual button is stopped.

5. The method of claim 1, wherein
   the physical document further comprises a plurality of the redacted portions,
   each of the plurality of the redacted portions comprises the tag comprising the first user rights,
   each of the first user rights of the plurality of the redacted portions comprises different levels of rights management,
   the second user rights comprise a level of rights management, and
   a level of rights management of the second user rights must match the level of rights management of the first user rights to show or display the non-redacted form of any of the plurality of redacted portions.

6. The method of claim 1, wherein the digital copy of the physical document is obtained from a remote server.

7. The method of claim 1, wherein the tag is a visual content on a surface of the physical document.

8. The method of claim 1, wherein the second user rights information is transmitted from the device using near-field communication.

9. The method of claim 1, wherein the physical document is imaged using a Projection with Interactive Capture (PIC) device comprising an imager and a projector.

10. A non-transitory computer readable medium (CRM) storing computer readable program code for processing an image of a physical document to show or display a redacted portion of the physical document embodied therein, the computer readable program code causes a computer to:
    identify, on the physical document, a tag associated with the redacted portion and comprising first user rights;
    obtain, based on the identified tag, a digital copy of the physical document comprising a non-redacted form of the redacted portion;
    receive, from a device within a predetermined distance from the physical document, second user rights;
    compare the second user rights to the first user rights and determine that the second user rights match the first user rights;
    project onto a surface of an augmented reality (AR) environment surrounding the physical document, based on the determination, information indicating that the non-redacted form of the redacted portion is able to be shown or displayed;
    receive, in response to the non-redacted form being able to be shown or displayed, an instruction to display the non-redacted form of the redacted portion; and
    project onto the surface at a predetermined distance from the physical document, based on the instruction, the non-redacted form of the redacted portion, wherein
    the information includes a virtual button projected onto the surface in the AR environment, and
    the instruction includes an interaction with the virtual button on the surface of the AR environment.

11. The CRM of claim 10, wherein identifying the tag further comprises:
    imaging the physical document to digitize a content of the physical document;
    analyzing the content using an optical character recognition and non-text content analysis; and
    identifying the tag within the analyzed content.

12. The CRM of claim 10, wherein the computer readable program code further causes a computer to:
    continuously display the non-redacted form of the redacted portion on the surface while the second user rights are received from the device; and
    stop the displaying of the non-redacted form of the redacted portion when a stop of receipt of the second user rights is detected.

13. The CRM of claim 10, wherein
    the displaying of the non-redacted form of the redacted portion on the surface continues as long as the interaction with the virtual button continues, and
    the computer readable program code further causes a computer to:
       stop the displaying of the non-redacted form of the redacted portion when when the interaction with the virtual button is stopped.

14. The CRM of claim 10, wherein
    the physical document further comprises a plurality of the redacted portions, each of the plurality of the redacted portions comprises the tag comprising the first user rights, each of the first user rights of the plurality of the redacted portions comprises different levels of rights management, the second user rights comprise a level of rights management, a level of rights management of the second user rights must match the level of rights management of the first user rights to show or display the non-redacted form of any of the plurality of redacted portions, and the physical document is imaged using a Projection with Interactive Capture (PIC) device comprising an imager and a projector.

15. A system for processing an image of a physical document to show or display a redacted portion of the physical document, the system comprising:

a memory; and a computer processor connected to the memory, wherein the computer processor:

identifies, on the physical document, a tag associated with the redacted portion and comprising first user rights;

obtains, based on the identified tag, a digital copy of the physical document comprising a non-redacted form of the redacted portion;

receives, from a device within a predetermined distance from the physical document, second user rights;

compares the second user rights to the first user rights and determines that the second user rights match the first user rights;

projects onto a surface of an augmented reality (AR) environment surrounding the physical document, based on the determination, information indicating that the non-redacted form of the redacted portion is able to be shown or displayed;

receives, in response to the non-redacted form being able to be shown or displayed, an instruction to display the non-redacted form of the redacted portion; and projects onto the surface at a predetermined distance from the physical document, based on the instruction, the non-redacted form of the redacted portion the information includes a virtual button projected onto the surface in the AR environment, and the instruction includes an interaction with the virtual button on the surface of the AR environment.

16. The system of claim 15, wherein identifying the tag further comprises:

imaging the physical document to digitize a content of the physical document;

analyzing the content using an optical character recognition and non-text content analysis; and identifying the tag within the analyzed content.

17. The system of claim 15, wherein the computer processor further:

continuously displays the non-redacted form of the redacted portion on the surface while the second user rights are received from the device; and stops the displaying of the non-redacted form of the redacted portion when a stop of receipt of the second user rights is detected.

18. The system of claim 15, wherein the displaying of the non-redacted form of the redacted portion on the surface continues as long as the interaction with the virtual button continues, and the computer processor further:

stops the displaying of the non-redacted form of the redacted portion when when the interaction with the virtual button is stopped.

19. The system of claim 15, wherein the physical document further comprises a plurality of the redacted portions, each of the plurality of the redacted portions comprises the tag comprising the first user rights, each of the first user rights of the plurality of the redacted portions comprises different levels of rights management, the second user rights comprise a level of rights management, a level of rights management of the second user rights must match the level of rights management of the first user rights to show or display the non-redacted form of any of the plurality of redacted portions, the physical document is imaged using a Projection with Interactive Capture (PIC) device comprising an imager and a projector, and the PIC device is controlled by the computer processor.

* * * * *